(12) United States Patent
Kokura

(10) Patent No.: US 6,370,301 B1
(45) Date of Patent: Apr. 9, 2002

(54) METHOD FOR FORMING FIBER GRATING AND FIBER GRATING FORMED BY THE SAME

(75) Inventor: Kunio Kokura, Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 0 days.

(21) Appl. No.: 09/500,482

(22) Filed: Feb. 9, 2000

Related U.S. Application Data

(63) Continuation of application No. PCT/JP99/03335, filed on Jun. 23, 1999, now abandoned.

(30) Foreign Application Priority Data

Jun. 26, 1998 (JP) .......................................... 10-196674

(51) Int. Cl.$^7$ ................................................ G02B 6/34
(52) U.S. Cl. ........................ 385/37; 385/385; 385/123; 385/130; 359/566; 430/321; 430/290
(58) Field of Search ......................... 385/37, 130, 123; 359/566, 569; 430/290, 321

(56) References Cited

U.S. PATENT DOCUMENTS

| | | | |
|---|---|---|---|
| 5,327,515 A | 7/1994 | Anderson et al. | 385/123 |
| 5,367,588 A | 11/1994 | Hill et al. | 385/37 |
| 5,620,495 A | 4/1997 | Aspell et al. | 65/392 |
| 5,745,615 A | 4/1998 | Atkins et al. | 385/37 |
| 5,745,617 A | 4/1998 | Starodubov et al. | 385/37 |
| 6,069,988 A * | 5/2000 | Kokura et al. | 385/37 |
| 6,204,304 B1 * | 3/2001 | Houlihan et al. | 359/566 |
| 6,221,566 B1 * | 4/2001 | Kohnke et al. | 385/37 |
| 6,222,973 B1 * | 4/2001 | Starodubov | 385/128 |

FOREIGN PATENT DOCUMENTS

| | | |
|---|---|---|
| JP | 10-082919 | 3/1998 |
| JP | WO99/27399 | 6/1999 |

OTHER PUBLICATIONS

International Search Report for PCT/JP99/03335 (Sep. 17, 1999).

Front page of Published PCT/JP99/03335 Application, WO00/00858 (Jan. 6, 2000).

* cited by examiner

Primary Examiner—Darren Schuberg
Assistant Examiner—Fayez Assaf
(74) Attorney, Agent, or Firm—Lacasse & Associates

(57) ABSTRACT

The present invention relates to a fiber grating formed on an optical component for processing optical signals and a method of forming the grating. After the sheath (2) of an optical fiber (3) is partially removed, the surface of the bare optical fiber (1) at an area where the sheath (2) is removed is covered by a resin film (7) having a thinness at which ultraviolet light permeability not hindering formation of gratings. Thereafter, by irradiating ultraviolet light (ultraviolet coherent light) via a phase mask (9), a grating where the refractive index of the core (4) of the bare optical fiber 81) cyclically changes in the beam axis is formed. The resin film (7) is made of, for example, an organic material having heat resistance, which is not dissolved by ultraviolet ray irradiation, such as polyimide resin, polyamideimide resin, etc. The thickness of the resin film (7) is 10 $\mu$m or less to ensure that ultraviolet light sufficiently permeates and the convergence of interference light is not lowered.

10 Claims, 3 Drawing Sheets

Ultraviolet coherent light

Ultraviolet coherent light

METHOD FOR FORMING FIBER GRATING AND FIBER GRATING FORMED BY THE SAME

This application is a continuation of International Application No. PCT/JP99/03335 filed Jun. 23, 1999, now abandoned.

TECHNICAL FIELD

The present invention relates to a method of forming fiber gratings used as components for various types of optical sensors and for optical transmission, and a fiber grating formed by the method.

BACKGROUND OF ARTS

As already known, for example, in the field of optical transmission, an optical fiber in which bare optical fibers are jacketed at the outer circumference is used, and the bare optical fibers are formed by covering the core thereof, which is an optical transmission path, with cladding. A fiber grating is such that the core of an optical fiber is made of, for example, germanium (Ge) doped quartz ($SiO_2$) glass, the refractive index is increased by irradiating intensive ultraviolet rays to the core, whereby cyclic refractive index changes arise in the beam axis of the optical fiber, and a refractive grating is formed.

The fiber grating functions as a reflection filter which selectively reflects only light if a specified wavelength, which is predetermined. For example, the fiber gratings are used as a division element, variable wavelength filter, a wavelength dispersion compensating element, sensor element etc., which are capable of dividing wavelengths by reflecting light of the specified wavelength from light which is multiplexed for wavelength division transmission.

As a method of forming fiber gratings, for example, a phase mask method, and holographic method are known. The phase mask method is such that ultraviolet rays are irradiated on optical fibers from above a phase mask to produce or form fiber gratings. For example, this method is described in a Journal Appl. Phys. Lett., 62, 1035. 1933, etc.

In the case of forming fiber gratings using the phase mask method, pressure hydrogen treatment is applied to an optical fiber in order to improve optical induction characteristics. As shown in FIG. 2, a sheath 2 of the optical fiber is partially removed to expose a predetermined length of the bare fiber 1. Next, as shown in the same drawing, for example, ultraviolet coherent light (ultraviolet light) emitted from a laser, etc., for ultraviolet ray irradiation, which is provided at a side of the optical fiber 3, is reflected by a mirror after being passed through a slit 5, and is condensed by a cylindrical lens 16. Thereafter, the light is caused to pass through a phase mask 9 and is irradiated onto a grating forming area 6 (fiber grating forming area) of the bare optical fiber 1.

In addition, a position where the laser is arranged is not specially limited. However, as shown in, for example, FIG. 4, there is a case where an excimer laser 11 is provided in a direction orthogonal to the beam axis of the exposed bare optical fiber 1, and after an ultraviolet coherent ray emitted from the excimer laser 11 is condensed by the lens 10 without providing a mirror 8 secured in FIG. 2, the condensed ray is irradiated onto the grating forming area 6 of the bare optical fiber 1.

In either case, as ultraviolet rays are irradiated on the bare optical fiber 1 through a phase mask 9, an intensively irradiated portion and a softly irradiated portion of ultraviolet rays are formed on the bare optical fiber 1, wherein at the intensively irradiated portion of ultraviolet rays, a bonding of Ge—Si of the core is frequently cut off, a ratio of increase in the refractive index is increased, and at the softly irradiated portion of ultraviolet rays, a bonding of Ge—Si of the core is hardly cut off, or no change in the refractive index occurs. Thus, by alternately forming a high portion of the refractive index and a low portion thereof, a multilayered structure is formed, in which the refractive index may differ in the lengthwise direction of optical fibers (that is, the refractive index of the core cyclically changes in the beam axis of the optical fibers).

During irradiation of ultraviolet rays, as shown in, for example, FIG. 4, since the optical fiber 3 is held by an optical fiber holding portion 13, the bare optical fiber 1 is held with a stress applied thereto, whereby the frequency of changes in the refractive index of the fiber grating does not slip.

Further, since a device shown in FIG. 4 repeats operations of an operation stage 12 by a stepping motor 14 after a grating is formed at a part of a bare optical fiber 1 by an excimer laser 11 and actions of forming another grating at different portions of the bare optical fiber 1, a fiber grating can be formed at a wide area of the bare optical fiber 1.

After the irradiation of ultraviolet rays is finished, there are many cases where heat is partially provided to the grating formed area 6 to remove defects in glass which are thermally unstable. In addition, the heat treatment is carried out by heating the bare optical fiber 1 at several tens of minutes at approx. 200° C. Further, in order to secure long-term reliability in the strength of optical fibers, the grating formed areas 6 are accommodated in a production sleeve such as, for example, a stainless steel pipe, or the sheath 2 is reproduced on the surface of the grating formed areas 6. Also, in a case where a grating formed area 6 is formed at the distal end of an optical fiber 3, the grating formed area 6 may be housed in, for example, a connector.

In a case where a fiber grating is formed by using a holographic method, interference light which is produced by interfering two coherent ultraviolet rays is irradiated on an optical fiber instead of forming an intensively irradiated portion and a softly irradiated portion of ultraviolet rays with a phase mask 9 provided, whereby an intensively irradiated portion and a softly irradiated portion of ultraviolet rays are formed, thereby forming a fiber grating.

Also, in cases of using a phase mask method as described above and cases of using the holographic method, basically, a series of processes consisting of removal of the sheath of the optical fiber 3, formation of gratings by irradiation of ultraviolet rays, heat treatment, and protection of grating formed areas 6, are carried out in order to form fiber gratings.

In a process of forming fiber gratings by performing the series of processes, it is unavoidable that an exposed bare optical fiber is brought into contact with other components, where dust is adhered to the bare optical fiber, or the glass surface of the bare optical fiber 1 is damaged.

Further, for example, moisture in the air may be provided to the bare optical fiber 1. As described above, when irradiating ultraviolet rays, since the optical fiber 3 is held by a predetermined tension applied to the bare optical fiber 1, stress corrosion may be produced by the humidity in the air when irradiating ultraviolet rays. Still further, in a fiber grating formed component, there is an optical component which holds both ends of the fiber grating formed area by metal with tension applied to the bare optical fiber 1 after irradiation of ultraviolet rays is finished, in order not to cause the frequency of changes in the refractive index to slip due to elongation and contraction of the fiber grating due to temperature changes. In such an optical component, stress corrosion may arise due to moisture after the irradiation of ultraviolet rays.

Therefore, such a problem occurs, by which the strength of portions is decreased, where the surface of the bare optical fiber 1 is damaged or stress corrosion arose, and the long-term reliability of optical fiber type optical components in which fiber gratings are formed will be lowered.

That is, in order to secure long-term reliability of components, a screening test is carried out, by which inferior portions incapable of standing against a load when the load necessary for a reliability design is applied are removed. As fiber gratings are formed by using a conventional forming method of fiber gratings, there are many cases where the fiber grating areas 6 may be broken by applying to the areas 6 only a load equivalent to 1.0 GPa or the like used for a comparatively low level screening test. Resultantly, the yield of products of optical fiber type optical components in which fiber gratings are formed was remarkably low.

Also, quartz which forms a bare optical fiber 1 may change in length due to temperature change, and another problem arises, in which the reflection wavelength band of fiber gratings shifts in line therewith. To avoid the problem, recently, tension is always applied to the bare optical fiber 1, wherein, when the bare optical fiber 1 is elongated in line with a temperature rise, the tension is decreased, while the tension is increased when the length of the bare optical fiber 1 is contracted in line with a temperature drop. Accordingly, such a method has been employed, by which the reflection wavelength band of fiber gratings can be kept constant by adjustment of the tension.

In order to employ this method for optical fiber type optical components, it is necessary to apply a load equivalent to 1.5 through 2.0 Gpa or the like to the fiber grating formed area 6 in the abovementioned screening test. However, if so, in optical fiber type optical components in which fiber gratings are formed by using the conventional fiber grating forming method, it can be said that nothing exists which can pass this level of screening test.

The present invention was developed in order to solve the conventional problems and shortcomings. It is therefore an object of the invention to provide a method of forming fiber gratings, by which strong fiber gratings having high reliability can be formed, and fiber grating formed optical components can be produced at a high yield, and to provide fiber gratings formed by this method.

DISCLOSURE OF THE INVENTION

In order to achieve the above object, the invention is constructed so that the following construction is used as means for solving the problems and shortcomings. That is, the first aspect of a method of forming fiber gratings, according to the invention, comprises the steps of covering the surface side of a bare optical fiber with a resin film having a thinness to obtain an ultraviolet ray permeability which does not hinder formation of the gratings; and thereafter forming gratings by which the refractive index of an optical waveguide of the bare optical fiber can cyclically change in the beam axis by irradiating ultraviolet rays from the surface side of the corresponding resin film.

Further, the second aspect of a method of forming fiber gratings, according to the invention, comprises the steps of partially removing the sheath of an optical fiber formed by providing the outer circumference of a bare optical fiber with a sheath; covering the surface side of the bare optical fiber at the areas, where the sheath is removed, with a resin film having a thinness by which an ultraviolet ray permeability not hindering formation of the gratings can be obtained; and thereafter forming gratings by which the refractive index of an optical waveguide of the bare optical fiber can cyclically change in the beam axis by irradiating ultraviolet rays from the surface side of the corresponding resin film.

In addition, the third aspect of a method of forming fiber gratings, according to the invention, comprises the steps of covering the surface side of a bare optical fiber with a resin film having a thinness to obtain an ultraviolet ray permeability which does not hinder formation of the gratings; thereafter providing a sheath for the outer layer at the outer circumferential side of the optical fiber on which the resin film is coated, and thereafter forming gratings by which the refractive index of the optical wavelength of a bare optical fiber can cyclically change in the beam axis by partially removing the sheath of the outer circumference of an optical fiber ribbon in a case where a bare optical fiber is provided with gratings by irradiating ultraviolet light from the surface side of the exposed resin film.

The invention is also featured in that the resin film is made of organic materials which are not dissolved by the ultraviolet ray heat irradiation heat.

In addition, the invention is also featured in that the resin film is composed of an organic material having heat resistance, by which the resin film is not melted by ultraviolet ray irradiation.

Further, a fiber grating, according to the invention, is featured in a grating, in which a sheath of an optical fiber formed by providing the sheath on the outer circumference of a bare optical fiber is partially removed, the surface side of the bare optical fiber at an area where the sheath is removed is covered with a resin film having such a thinness to obtain an ultraviolet ray permeability not hindering formation of the grating, and the refractive index of an optical waveguide cyclically changes in the beam axis of the bare optical fiber by irradiating ultrasonic rays from the surface of the resin film.

Also, a fiber grating, according to the invention, is featured in that after a grating is formed on a bare optical fiber by irradiation of the ultraviolet rays, the outer circumferential surface of a resin film having an ultraviolet ray permeability is shielded with a reinforcing material.

According to the invention, since ultraviolet rays are irradiated from the surface side of a resin film after the surface side of a bare optical fiber is covered with the resin film having a thinness to obtain an ultraviolet ray permeability not hindering formation of the gratings, it is possible to prevent the bare optical fiber from being brought into contact directly with other components, and to prevent dust and/or foreign substances from being adhered to the surface of the bare optical fiber. As a result, it is possible to avoid damaging the surface of the bare optical fiber by the contact and/or dust or foreign substances. Still further, it is possible to avoid moisture adhering to the surface of the bare optical fiber and stress corrosion arising when irradiating ultraviolet rays.

Therefore, according to the invention, such conventional problems can be effectively prevented, in which the strength of the portions is lowered where the surface of a bare optical fiber is damaged and stress corrosion arose, and the long-term reliability of optical fiber type optical components in which fiber gratings are formed is lowered. Therefore, it is possible to produce optical components having strong fiber gratings and having excellent long-term reliability at a higher yield.

In particular, according to the invention in which a resin film is formed of an organic material having heat resistance by which the resin film is not melted by ultraviolet ray irradiation, since it is possible to prevent the resin film from deteriorating due to heat added to the resin film when irradiating ultraviolet rays and heat added to the resin film after formation of fiber gratings, optical components having greater strength fiber gratings with excellent long-term reliability can be produced.

BEST MODE FOR CARRYING OUT THE INVENTION

In order to describe the invention in further detail, a description is given of the invention in compliance with the accompanying drawings. Further, in the following description of the preferred embodiment, components which are the same as those in the conventional example are given the same reference symbols, and an overlapping description of the common components is omitted or simplified.

Figure 1:
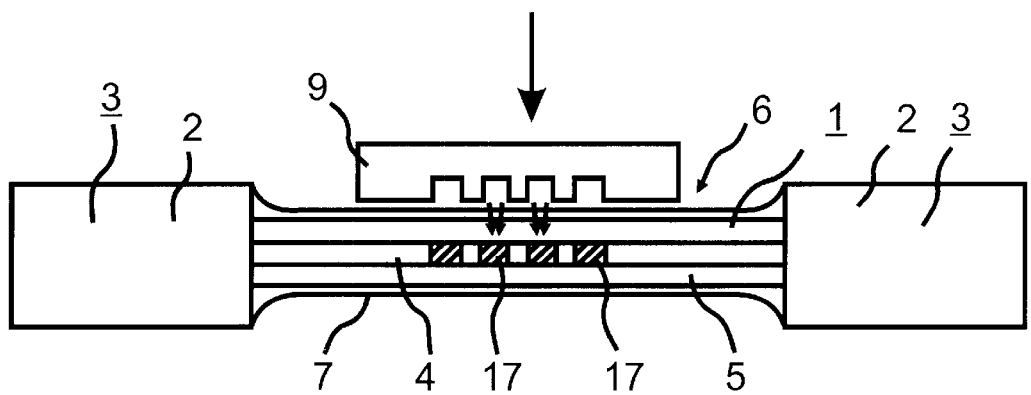
FIG. 1 is an explanatory view showing major parts of an ultraviolet ray irradiating process after a resin film 7 is formed, which is characteristic in a preferred embodiment of a method of forming fiber gratings according to the invention.

FIG. 1 is an explanatory view of the best characteristic process in a preferred embodiment of a method of forming fiber gratings according to the invention. As illustrated in the same drawing, the best characteristic point of the preferred embodiment is in that after a sheath 2 of an optical fiber ribbon 3 is partially removed, the surface side of a bare optical fiber 1 at an area where the sheath 2 is removed is covered with a resin film 7 having a thinness to obtain an ultraviolet ray permeability not hindering formation of the gratings, and thereafter gratings are formed, by irradiating ultraviolet rays from the surface side of the resin film 7, whereby the refractive index of a core 4 of the bare optical fiber 1 cyclically changes in the beam axis.

FIG. 1 is an explanatory view of the best characteristic process in a preferred embodiment of a method of forming fiber gratings according to the invention. As illustrated in the same drawing, the best characteristic point of the preferred embodiment is in that after a sheath 2 of an optical fiber 3 is partially removed, the surface side of a bare optical fiber 1 at an area where the sheath 2 is removed is covered with a resin film 7 having a thinness to obtain an ultraviolet ray permeability not hindering formation of the gratings, and thereafter gratings are formed, by irradiating ultraviolet rays from the surface side of the resin film 7, whereby the refractive index of a core 4 of the bare optical fiber 1 cyclically changes in the beam axis.

In the preferred embodiment, as in the conventional example, pressure hydrogen treatment is carried out for the optical fiber 3 in order to improve light induction characteristics. And, after pressure hydrogen treatment is carried out, the sheath 2 is partially removed. As shown in FIG. 1, after the resin film 7 is formed, ultraviolet coherent light (ultraviolet rays) emitted from an ultraviolet ray irradiating laser, etc., is condensed by a lens (not illustrated), and irradiated onto a grating formed area 6 of the bare optical fiber 1 through a phase mask 9, whereby a fiber grating is formed.

The inventor used a resin material to form a resin film 7 and thickness of the material as parameters in order to specify the material and thickness of the resin film 7 used for a method of forming fiber gratings according to the preferred embodiment, and formed fiber gratings while changing these parameters, whereby the inventor examined the reflectance of light of a 1550 nm band wavelength in the grating formed area 6 and a tensile strength of the grating formed area 6. The results are shown in Table 1. Table 1 also shows, as comparison examples, the reflectance of fiber gratings and tensile strength of the bare optical fiber 1 in a case where fiber gratings are formed without providing the resin film 7. In addition, the tensile strength was measured on the basis of sample number n=25.

TABLE 1

| Resin film Type | Film thickness | 1550 nm band reflectance (%) | Tensile strength (Sample number n = 25) (GPa) | | | |
| --- | --- | --- | --- | --- | --- | --- |
| | | | Min. value | 90% value | 50% value | Max. value |
| Polyurethane resin | 1 | 90 | 0.60 | 0.93 | 1.73 | 2.38 |
| | 2 | 92 | 0.66 | 0.92 | 1.87 | 2.44 |
| | 4 | 91 | 0.59 | 0.88 | 1.77 | 2.54 |
| | 6 | 92 | 0.64 | 0.82 | 1.75 | 2.43 |
| | 8 | 86 | 0.51 | 0.92 | 1.68 | 2.36 |
| | 10 | 65 | 0.58 | 0.88 | 1.86 | 2.35 |
| | 15 | 23 | 0.61 | 0.92 | 1.91 | 2.52 |
| Polyimide resin | 1 | 91 | 0.68 | 1.01 | 1.94 | 2.86 |
| | 2 | 93 | 0.80 | 1.10 | 2.15 | 3.14 |
| | 4 | 90 | 0.82 | 1.13 | 2.12 | 3.11 |
| | 6 | 92 | 0.78 | 1.08 | 1.98 | 3.05 |
| | 8 | 84 | 0.74 | 1.10 | 2.08 | 3.11 |
| | 10 | 72 | 0.80 | 1.21 | 2.24 | 3.18 |
| | 15 | 27 | 0.83 | 1.19 | 2.22 | 3.04 |
| Polyamide-imide resin | 1 | 92 | 0.68 | 1.04 | 2.04 | 2.96 |
| | 2 | 91 | 0.78 | 1.14 | 2.11 | 3.11 |
| | 4 | 91 | 0.75 | 1.16 | 2.08 | 3.02 |
| | 6 | 93 | 0.72 | 1.03 | 2.08 | 3.12 |
| | 8 | 84 | 0.79 | 1.12 | 2.02 | 3.07 |
| | 10 | 68 | 0.77 | 1.08 | 2.12 | 3.11 |
| | 15 | 28 | 0.74 | 1.19 | 2.02 | 3.14 |
| Nothing (Comparison example) | 0 | 92 | 0.16 | 0.32 | 0.78 | 1.38 |

When examining the above, in details, an optical fiber type optical component having a fiber grating was produced as shown below. First, a dispersion shift optical fiber which is generally used was used as an optical fiber (optical fiber 3) for which a fiber grating is formed. The optical fiber was made into an optical fiber 3 in which the center core is covered by a side core having a smaller refractive index than that of the center core, the side core is covered by cladding 5 to make the refractive index profile into a dual-shaped profile and the mean $GeO_2$ concentration of the center core is 6% in weight. In addition, the sheath 2 of the optical fiber 3 was made of ultraviolet ray hardening type acrylic resin, and the outer diameter of the optical fiber 3 was 250 $\mu m\phi$.

Further, pressure hydrogen treatment intended for improvement of the abovementioned light induction characteristics was carried out with the optical fiber 3 retained in hydrogen under pressure greater by 180 times than the atmospheric pressure for two weeks. And, a small flaw was given to the sheath 2 of the optical fiber 3 after the pressure hydrogen treatment, an organic solvent was caused to soak into the flawed part, and the sheath 2 was peeled off from the surface of the optical fiber 3, wherein the sheath 2 equivalent to a length of approx. 30 mm, which would become a grating fiber formed area, was removed.

Subsequently, after the sheath 2 removed part was immersed in varnish of resin forming a resin film 7 for a short time, the part was lifted up and dried by warm air, thereby forming the resin film 7. Herein, the viscosity of the varnish of the resin was adjusted by changing the ratio of the resin to solvent so that the thickness of the resin film 7 becomes an appointed thickness, whereby the thickness of the resin film 7 was also adjusted. In addition, where the resin film 7 is made of polyurethane resin, polyurethane resin varnish (made by the Totoku Paint Co., Ltd, brand name: FL3-60-52) was used, if the resin film 7 was made of a polyimide resin film, polyimide resin varnish (made by the Toray Ltd., brand name: Torenees #3000) was used, and if the resin film 7 was made of a polyamideimide resin film, polyamideimide resin varnish (made by the Hitachi Chemical Corp., brand name: HI-405) was used.

Figure 2:
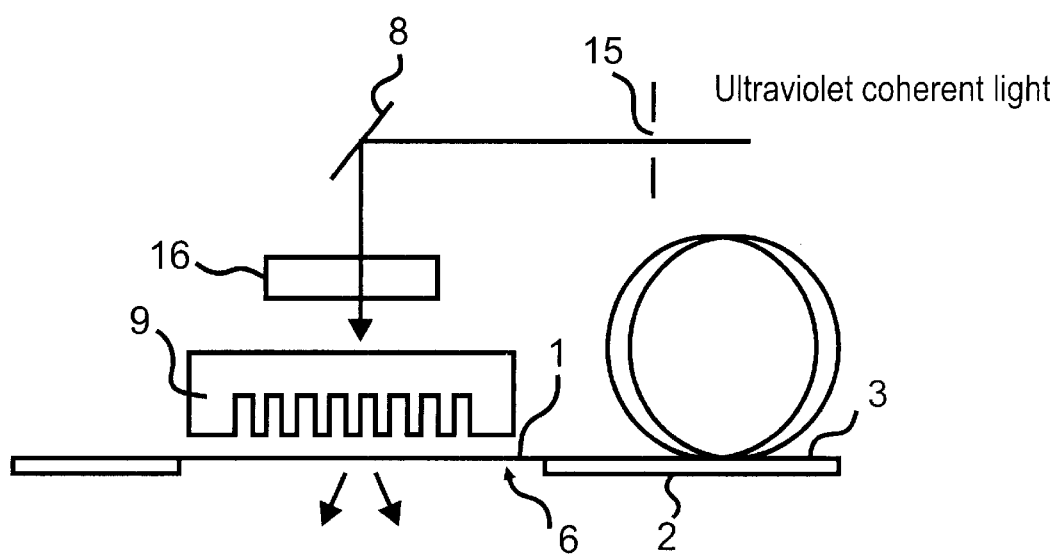
FIG. 2 is an explanatory view showing an ultraviolet ray irradiating process in the method of forming fiber gratings.

Further, the wavelength of ultraviolet coherent light to be irradiated was 244 nm. As shown in FIG. 2, only the core of the ultraviolet coherent light beam was picked up by causing it to pass through a space slit 15, whereby by moving a mirror 8, the ultraviolet coherent light was irradiated onto the grating forming area 6 of a bare optical fiber 1 while causing the light beam to scan in the length direction of the bare optical fiber 1, whereby a fiber grating was formed. In addition, during the irradiation of ultraviolet ray, the bare optical fiber 1 is held with tension of 10 grf applied, so that the bare optical fiber 1 is not bent. Further, the ultraviolet ray was irradiated with a phase mask 9 brought into contact with the surface (surface of the bare optical fiber 1 in the comparison example) of the resin film 7.

An infrared ray lamp was irradiated onto the fiber grating formed area thus obtained, the fiber was held in an inert atmosphere for 20 minutes so that the temperature of the bare optical fiber becomes 180° C. Thereafter, acrylic resin which is the same as that of the sheath 2 was coated on the surface of the resin film 7 again to almost the same diameter as a reinforcing material, whereby the acrylic resin was hardened by soft ultraviolet rays.

As has been made clear from Table 1 above, in the comparison example in which a fiber grating was formed by irradiation of ultraviolet light without forming any resin film 7 as in the conventional fiber grating forming method, the tensile strength of the grating formed area 6 is weak, all the twenty-five samples were broken with tension of 1.5 Gpa or less.

To the contrary, even in cases where a resin film 7 made of either one of polyurethane resin, polyimide resin, or polyamideimide resin is formed, and ultraviolet light is irradiated, the tensile strength was further improved than that of the comparison examples. The tensile strength exceeded 0.8 GPa in 90% of all the samples (indicated as a 90% value in Table 1), the tensile strength exceeded 1.5 GPa in 50% of the samples (indicated as a 50% value in Table 1), whereby high screening could be cleared. That is, if ultraviolet light is irradiated after the resin film 7 is formed, the bare optical fiber 1 is prevented from being brought into contact directly with other components, and the surface of the bare optical fiber 1 can be made free from any dust. Therefore, it is possible to avoid damaging the surface of the bare optical fiber 1 by the contact and/or dust, and it is possible to avoid stress corrosion arising due to moisture provided on the surface of the bare optical fiber 1 when and after irradiating ultraviolet light. Therefore, fiber grating having high strength can be formed.

In particular, in a case where a resin film 7 is made of polyimide resin and polyamideimide resin and ultraviolet light irradiation is carried out, the tensile strength is further improved by 20% than in a case where a resin film 7 is formed of polyurethane resin and ultraviolet light is irradiated. Thus, if the resin film 7 is made and formed of resin having heat resistance characteristics such as polyimide resin and polyamideimide resin, since such types of resin can stand against a high temperature of 500° C. in a short time, such resin is made free from any heat deterioration resulting from ultraviolet light irradiation and heat treatment after fiber gratings are formed, it is considered that it is possible to form greater strength fiber grating type optical components. Therefore, it was found that it is further preferable to form a fiber grating by using such heat-resisting organic materials as a resin film 7.

Further, in a case where a resin film 7 is formed of polyurethane resin to form a fiber grating, according to microscopic observations made by the inventor, more or less deterioration was found, resulting from ultraviolet irradiation and heat treatment. However, in a case where a fiber grating is formed by forming a resin film 7 made of polyimide resin and polyamideimide resin which are heat-resisting materials, no deterioration could be found.

In addition, as shown in Table 1, since a wavelength 1550 nm band reflectance is considerably lowered as the film thickness of the resin film 7 exceeds 10 μm, in the preferred embodiment, the film thickness of the resin film 7 was made thinner than 10 μm, taking the reflectance into consideration. It is considered that, if the film of the resin film 7 is thick, refraction arises while ultraviolet rays pass through the resin film 7, and the convergence to the core 4 is lowered, fiber gratings cannot be sufficiently formed. In addition, it becomes difficult to form a resin film 7 with a uniform thickness if the film of the resin film 7 is thick, and it is considered that a probability in which the phase mask 9 is diagonally disposed with respect to the core 4 due to projections and dents of the resin film 7 is increased when the phase mask 9 is set in contact with the resin film 7.

Figure 3:
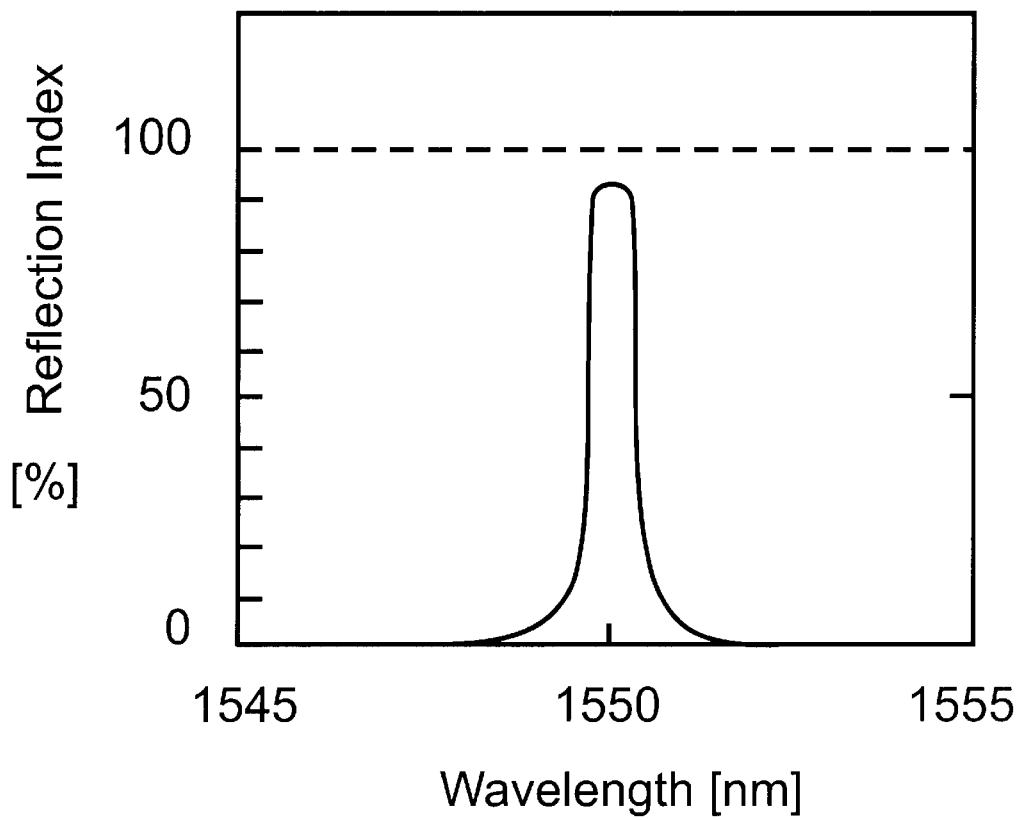
FIG. 3 is a graph showing one example of a reflection spectrum of the fiber gratings formed by using the method of forming fiber gratings according to the preferred embodiment.
Figure 4:
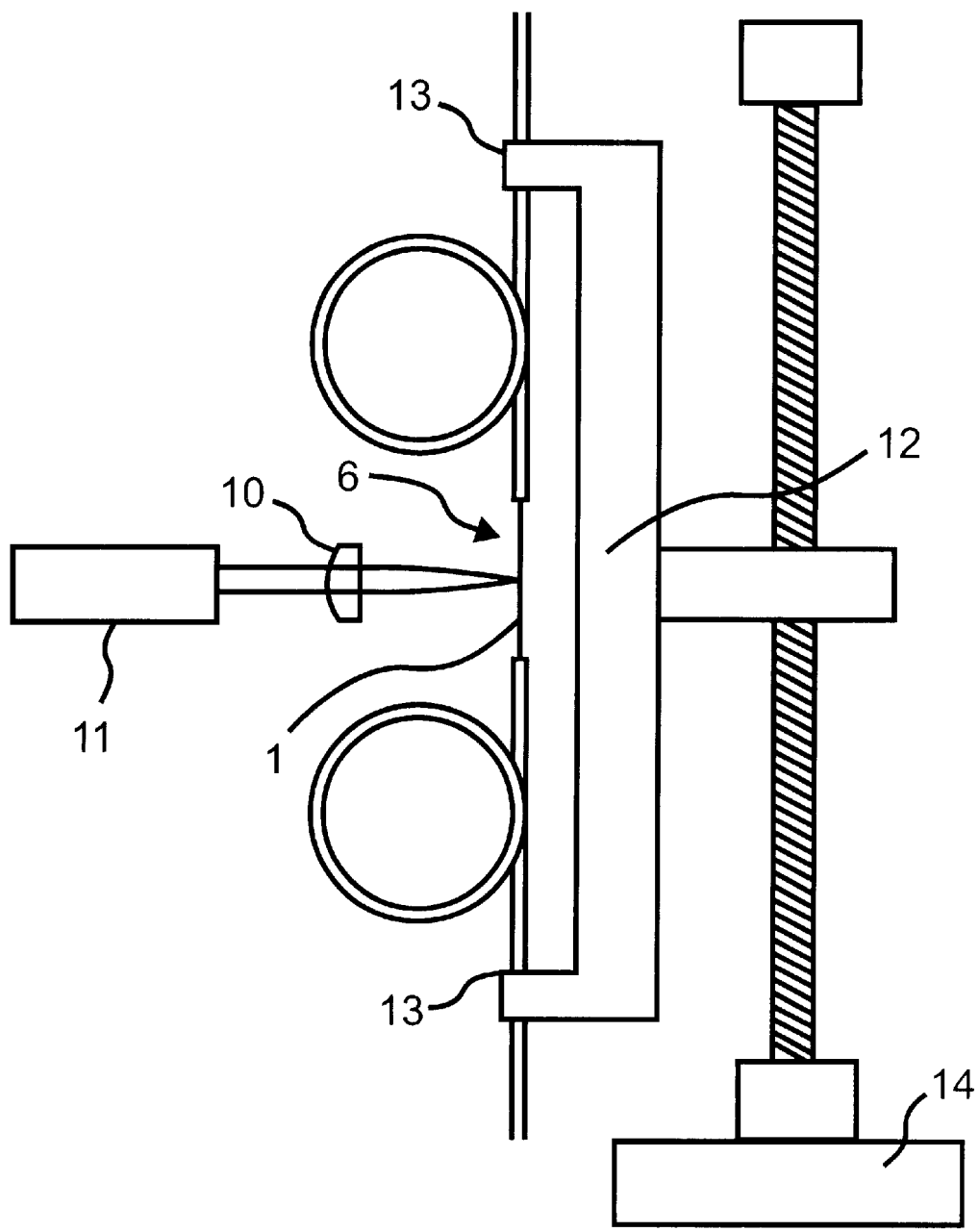
FIG. 4 is an explanatory view showing one example of a device used in the method of forming conventional fiber gratings.

Provisionally, as shown in FIG. 3, in order for the reflectance of the abovementioned 1550 nm band wavelength to become 80% or more, it is preferable that the thickness of the polyurethane resin film 7 is 6 μm or less and the thickness of polyimide resin and polyamideimide resin is 8 μm or less.

According to the preferred embodiment, on the basis of the above results, as shown above, after the sheath 2 of the optical fiber 3 is partially removed, the surface of the bare optical fiber 1 at the sheath 2 removed area is covered by a resin film 7 such as polyurethane resin, polyimide resin or polyamideimide resin having a thinness of 10 μm or less at which ultraviolet light permeability not hindering formation of fiber gratings can be obtained. Thereafter, fiber gratings are formed by irradiating ultraviolet light from the surface of the resin film 7. Therefore, it is possible to produce, at a high yield ratio, optical fiber type optical components which have a high reflectance at the grating formed area 6, are free from almost no deterioration in strength of the fiber gratings due to flaws and stress corrosion produced on the surface of the bare optical fiber 1 at the grating formed area 6, and have a high strength and high reliability in a long-term use.

Further, the invention is not limited to the above preferred embodiment, and it may be subjected to various modifications in a range not departing from the spirit of the invention. For example, in the above preferred embodiment, although a resin film 7 is made of polyurethane resin, polyimide resin or polyamideimide resin, the material for forming a resin film 7 is not specially limited. It may be adequately determined. However, if the resin film 7 is formed of resin having heat resistance described above such as polyimide resin and polyamideimide resin, etc., no heat deterioration resulting from ultraviolet irradiation heat and heat treatment after forming fiber gratings occurs. Therefore, greater strength grating fiber type optical components can be formed, and it is preferable that the resin film 7 is formed of an organic material with such heat resistance as described above.

In addition, although, in the preferred embodiment, the thickness of the resin film 7 was 10 μm, the thickness of the resin film 7 is not specially limited. it is adequately determined to a thinness, not hindering formation of gratings, at which ultraviolet light permeability can be obtained.

Furthermore, in the preferred embodiment, the optical fiber 3 which forms fiber gratings was a dispersion shift optical fiber with a dual-shaped refractive index profile. However, the type of optical fiber 3 and refractive index profile are not specially limited. These may be adequately determined. A dopant which increases the refractive index by ultraviolet ray irradiation, such as germanium, aluminum, phosphor, etc., may be doped on the core 4, or may be doped on both the core 4 and cladding 5. In addition, if the dopant is doped on both the core 4 and cladding 5, gratings may be formed on both the core 4 and cladding 5.

Further, there is also no limitation in the type of laser for ultraviolet ray irradiation, ultraviolet ray intensity, direction of ultraviolet ray irradiation, a method for heat treatment after fiber gratings are formed, etc. These may be adequately determined.

In addition, in the preferred embodiment, a description was given of an example of forming fiber gratings using a phase mask. However, in the invention, it is possible to apply a holographic method and other methods as a method of forming fiber gratings.

Also, the area where gratings are formed may remain as it is covered by the resin film 7 having ultraviolet permeability. However, when reinforcing the grating formed area, the entire circumferential surface of the resin film 7 is covered by a reinforcing resin layer as in the abovementioned preferred embodiment in order to reinforce the grating formed area. Also, there is no limitation in the type of the reinforcing resin. Using a metallic pipe as a reinforcing material, the grating formed area may be reinforced. Further, the thickness of the sheath is not specially limited (including the thickness of a reinforcing resin layer). Preferably, the sheath may be produced so as to have the same outer diameter as that of the sheath 2 of an optical fiber, whereby no great gap is produced on the outer surface of the optical fiber.

Further, in the preferred embodiment, although a resin film 7 is formed on the surface of the bare optical fiber after the sheath 2 is partially removed, it may be possible that, without forming the sheath 2 of the bare optical fiber 1, a resin film 7 is provided (or secured) in advance on the surface of the bare optical fiber 1, or when securing gratings, a resin film 7 is covered on the surface of the bare optical fiber 1 not having any sheath 2, gratings are formed on the bare optical fiber 1 by irradiating ultraviolet light from the surface of the resin film 7 at the grating formed area when securing gratings on the bare optical fiber 1. In this case, since no sheath 2 is provided on the surface of the bare optical fiber 1, no work for removing the sheath 2 is required.

As a matter of course, after the resin film 7 is provided on the surface of the bare optical fiber 1, an outer sheath 2 may be provided or secured on the surface of the resin film 7. In this case, although the sheath 2 is partially removed when securing fiber gratings on the bare optical fiber 1, the resin film 7 is exposed by removing the sheath 2, and it is possible to form gratings on the bare optical fiber 1 by irradiating ultraviolet light from the surface of the resin film 7. The method of forming gratings may omit work for sheathing the resin film 7 on the surface of the bare optical fiber 1 after the sheath 2 is removed.

Industrial Applicability

As described above, a fiber grating according to the invention is applicable to optical fibers for transmitting optical signals, and fiber gratings of optical components such as division elements for processing optical signals, variable wavelength filters, wavelength division compensating elements, and sensor elements, etc. In addition, a method of forming fiber gratings according to the invention is applicable to the abovementioned optical fibers, and formation of fiber gratings of optical components.

What is claimed is:

1. A method of forming a grating in a waveguide, comprising the steps of:
   covering the surface of the waveguide with a resin film of a thickness that permits sufficient ultraviolet light permeability to allow the formation of a grating within the waveguide having a refractive index variation within the optical waveguide that cyclically changes along a longitudinal axis thereof by irradiation of ultraviolet light through the surface of said resin film;
   wherein said resin film having the ultraviolet light permeability is of a material of any one of a polyurethane resin, a polyimide resin and a polyamideimide resin to have a film thickness of 6 μm or smaller when said resin film is polyurethane, a film thickness of 8 μm or smaller when said resin is polyimide or a film thickness of 8 μm or smaller when said resin is polyamideimide.

2. A method of forming fiber gratings as set fourth in claim 1 wherein the resin film is formed by immersing a bare optical fiber in a varnish containing a resin film material, followed by being lifted up and dried by warm air.

3. A method as defined in claim 1 wherein the waveguide is an optical fiber and where the step of covering the surface is confined to covering a bare optical fiber.

4. A method as defined in claim 3, wherein the bare optical fiber has a sheath covering removed prior to covering the surface of the optical fiber with the resin film.

5. A method of forming fiber gratings, comprising the steps of:
   partially removing a sheath of an optical fiber core formed so as to have a sheath on the outer circumferential side of a bare optical fiber;
   covering the surface of said bare optical fiber at an area, where said sheath was removed, by a resin film having a thickness at which ultraviolet light permeability not hindering formation of gratings can be obtained; and
   thereafter forming a grating by which the refractive index of an optical waveguide of a bare optical fiber cyclically changes in the beam axis by irradiation of ultraviolet light from the surface of said resin film;

wherein said resin film having the ultraviolet light permeability is of a material of any one of a polyurethane resin, a polyimide resin and a polyamideimide resin to have a film thickness of 6 µm or smaller when said resin film is polyurethane, a film thickness of 8 µm or smaller when said resin is polyimide or a film thickness of 8 µm or smaller when said resin is polyamideimide.

6. A method of forming fiber gratings as set fourth in claim 5 wherein the resin film is formed by immersing the bare optical fiber in a varnish containing a resin film material, followed by being lifted up and dried by warm air.

7. A method of forming fiber gratings, comprising the steps of:

covering the surface of a bare optical fiber by a resin film having a thickness at which ultraviolet light permeability not hindering formation of gratings can be obtained;

providing an outer layer resin film on the outer circumference of an optical fiber on which the resin film is covered; and thereafter forming a grating by which the refractive index of an optical waveguide of a bare optical fiber cyclically changes in the beam axis by partially removing said outer layer resin film of an optical fiber core and irradiating ultraviolet light from the surface of said exposed resin film;

wherein said resin film having the ultraviolet light permeability is of a material of any one of a polyurethane resin, a polyimide resin and a polyamideimide resin to have a film thickness of 6 µm or smaller when said resin film is polyurethane, a film thickness of 8 µm or smaller when said resin is polyimide or a film thickness of 8 µm or smaller when said resin is polyamideimide.

8. A method of forming fiber gratings as set fourth in claim 7 wherein the resin film is formed by immersing the bare optical fiber in a varnish containing a resin film material, followed by being lifted up and dried by warm air.

9. A fiber grating featured in that a sheath of an optical fiber core formed so as to have a sheath on the outer circumferential side of a bare optical fiber is partially removed;

the surface of said bare optical fiber at an area, where said sheath was removed, is covered by a resin film having a thickness at which ultraviolet light permeability not hindering formation of gratings can be obtained; and thereafter a grating is formed, by which the refractive index of an optical waveguide of a bare optical fiber cyclically changes in the beam axis by irradiation of ultraviolet light from the surface of said resin film;

wherein said resin film having the ultraviolet light permeability is of a material of any one of a polyurethane resin, a polyimide resin and a polyamideimide resin to have a film thickness of 6 µm or smaller when said resin film is polyurethane, a film thickness of 8 µm or smaller when said resin is polyimide or a film thickness of 8 µm or smaller when said resin is polyamideimide.

10. A fiber grating as set forth in claim 9, wherein after a grating is formed on a bare optical fiber by irradiation of ultraviolet light, the outer circumferential surface of the resin film having ultraviolet light is reinforced by a reinforcing material.

* * * * *